April 2, 1957    M. S. CRANE    2,787,162
SEGMENTED MEASURING CUP
Filed March 15, 1956    2 Sheets-Sheet 1
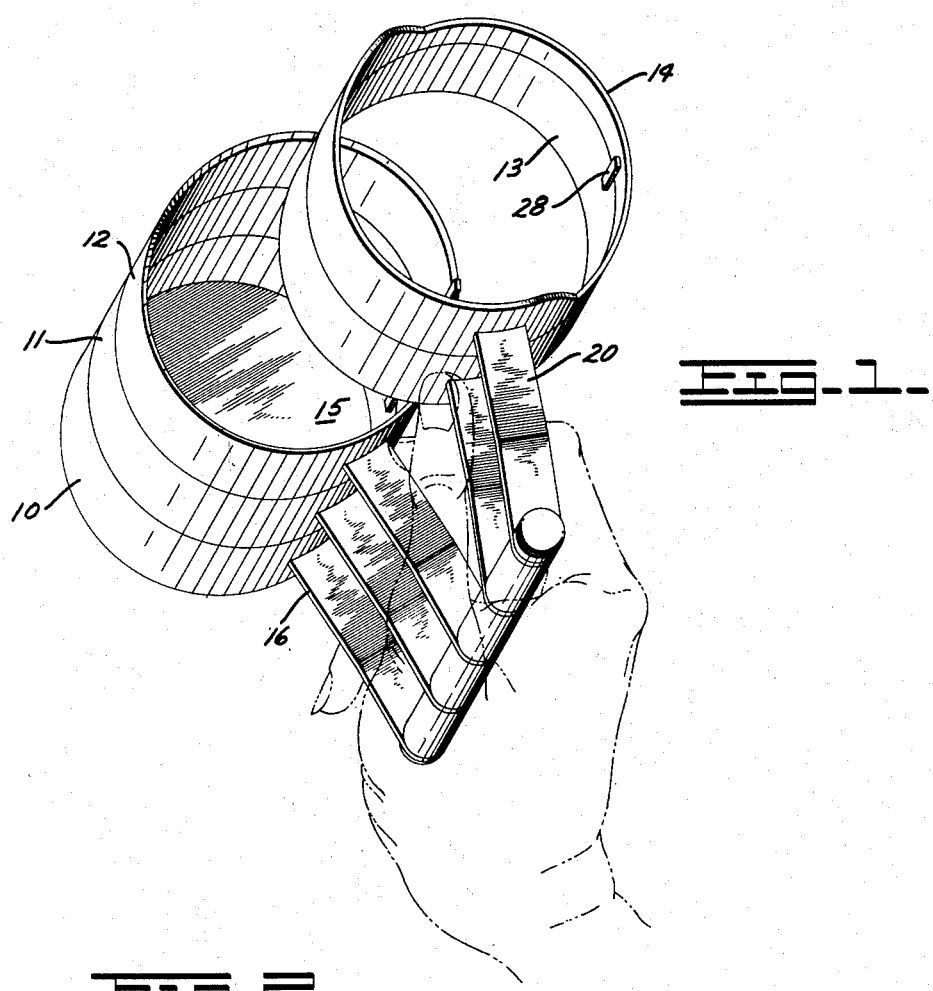
FIG-1-
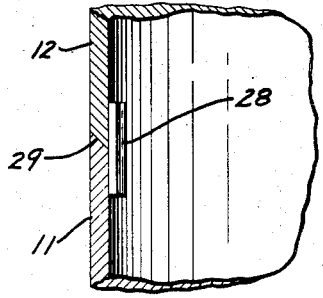
FIG-2-
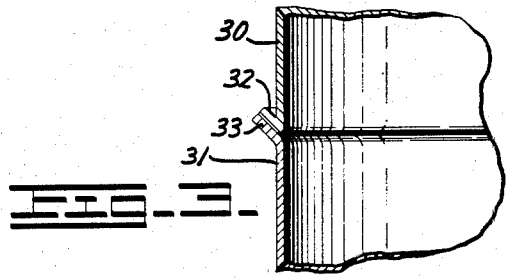
FIG-3-
INVENTOR
Moses S. Crane
BY
ATTORNEY April 2, 1957  M. S. CRANE  2,787,162
SEGMENTED MEASURING CUP
Filed March 15, 1956  2 Sheets-Sheet 2
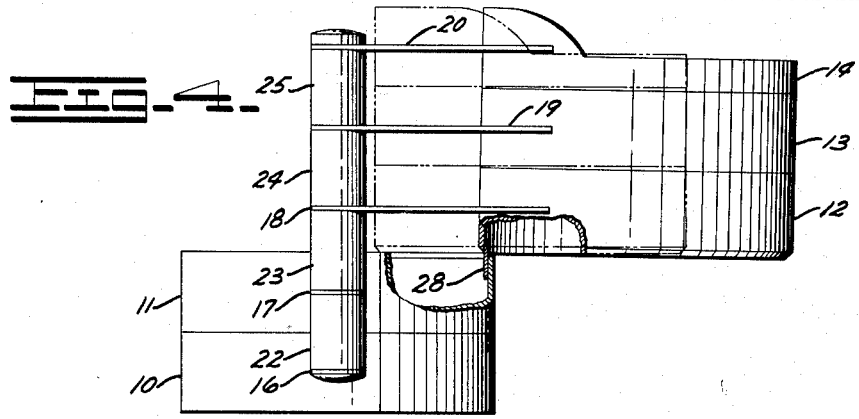
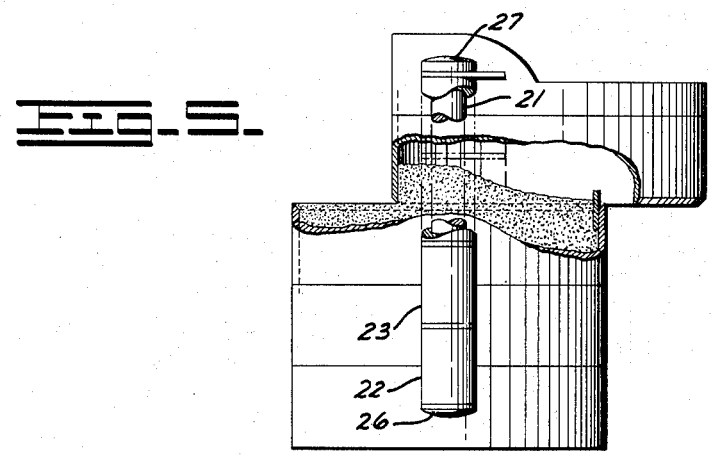
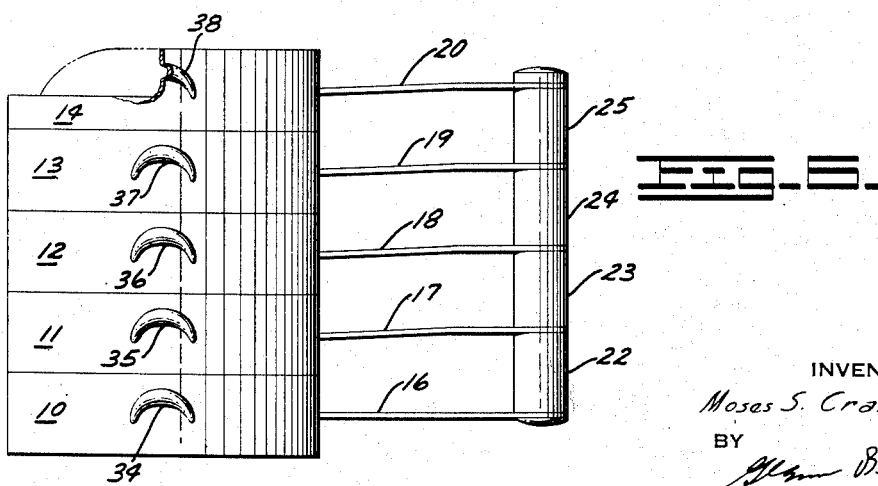
INVENTOR
Moses S. Crane
BY
ATTORNEY

United States Patent Office 2,787,162
Patented Apr. 2, 1957

2,787,162

SEGMENTED MEASURING CUP

Moses S. Crane, Cedar Springs, Mich.

Application March 15, 1956, Serial No. 571,644

6 Claims. (Cl. 73—429)

This invention relates to the construction of segmented measuring cups constructed from a series of separable cylindrical elements which are normally in coaxial relationship. One of the end members of the series of cylindrical elements is provided with a closure plate which forms the bottom of a cup when all of the elements are in alignment. It is well known that the dimensions of the several elements may be selected to provide standard volumetric measurements. A measuring cup of the type used in baking, for example, may be formed of a series of four elements which together form a full cup measure. When a half cup of material is desired, the entire unit may be used as a scoop. After having been filled, the scoop may be disengaged at the junction between the second and third elements so that the excess over a half cup is swept off and returned to the storage bin. It is also well known that each of the elements may be mounted on a radially-extending arm which is pivotally connected to a member of some type in such a fashion that each of the elements may be swung with respect to the others.

The features provided by this invention relate to the formation of the elements themselves at their interengaged edges, and also to the construction of the radially-extending arms, and these features permit a very simple single-handed manual operation of the device such that the elements can be disengaged wherever desired with a very simple type of manipulation. The invention also provides stops which limit the degree of angular separation of the elements about the axis of the pivot bolt so that the elements never become completely disengaged. Complete disengagement would complicate the return of the same to a position of coaxial alignment.

The several features of the invention will be analyzed in detail through a discussion of the particular embodiments illustrated in the accompanying drawings. In the drawings, Figure 1 presents a perspective view of a measuring cup embodying this invention, and illustrating the type of manual manipulation used to disengage the elements to establish the desired measure.

Figure 2 is a section on an enlarged scale from that of Figure 1, and showing the preferred formation of the edges of the elements and the limit stop.

Figure 3 illustrates a modified form of the invention.

Figure 4 presents a view in side elevation showing the function of the stop lugs and the relationship of the elements.

Figure 5 illustrates the action of the elements in establishing an exact measure.

Figure 6 illustrates a modification of the invention providing special areas for the contact of the thumb to effect disengagement of the elements.

Referring to the drawings, a measuring cup is formed by a series of cylindrical elements 10, 11, 12, 13, and 14. The end element 10 is provided with a transverse closure plate 15. When all of the elements are in axial alignment, they establish a full "cup" of volume measurement. When exactly a full cup is desired, the top element 14 is disengaged from the remaining four and caused to sweep over the top of the element 13, with the excess of material being dropped outside the unit. A series of arms 16 through 20, inclusive, are attached to and extend radially from the elements 10 through 14, respectively, and are provided with apertures at their outer ends which are traversed by the bolt 21. A series of cylindrical spacer elements 22 through 25 separate the resilient arms at the bolt, and the dimensional relationships between the various components result in the application of a biasing force by the arms to the cylindrical elements urging them together to form a tight and continuous unit. The heads 26 and 27 at the opposite ends of the bolt provide a clamping action which permits the application of some degree of bending moment to the resilient arms so that the biasing action can be maintained.

In the illustrated modification of the invention, the elements 10, 11, 12, and 13 are each provided with a lug as shown at 28 in Figure 1, and which extends across the plane of junction between the element to which it is secured and the one adjacent to it. These lugs serve two functions. The first of these is to limit the possible direction of angular displacement to that illustrated in Figure 1. The second function is illustrated in Figure 4, and prevents the complete separation of the elements which would otherwise be accompanied by a shifting movement of one of the separated elements with respect to the other in axial direction, and would render somewhat troublesome the return of the elements to coaxial relationship.

The junction between the elements, according to the preferred form of the invention, is illustrated in Figure 2. The top edge of each of the elements, indicated at 29 in Figure 2, is preferably beveled in an outwardly flaring direction, and receives the lower edge of the element adjacent to it in the manner of a socket. The importance of the socket engagement is in the dual function of (a) providing the axial alignment of the elements, while (b) permitting the application of lateral force to disengage the elements through pushing the upper element up the ramp provided by the beveled edge. It is also possible to reverse the angle of bevel so that the "socket" characteristic appears on the bottom of the elements. Figure 3 illustrates a modified form of the invention in which a thinner material is used to form the elements 30 and 31, with the beveled edges being formed by bending the material as shown at 32 and 33 to form interengaged annular rims.

Figure 6 illustrates the manner in which a series of protrusions 34 through 38 are provided for the engagement of the thumb during the manipulation of the device. The use of these protrusions makes it somewhat easier for a person to detect, entirely with his sense of touch, the location of the separable elements. A person of fairly strong hands, however, will find it easy to manipulate the device entirely through grasping the resilient arms in the manner indicated in Figure 1. Even the application of a substantial force by the resilient arms tending to compress the cylindrical elements together will not be sufficient to seriously interfere with the disengagement of the elements by applying opposite forces between the first finger and the thumb. With the other fingers of the hand interengaged with the other resilient arms, or at least in position to accurately sense their location, a similar disengagement can be made at any desired fractional measure. Pressure can be applied to the arms in such a direction as to facilitate separation.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A measuring cup, comprising: a series of cylindrical tubular elements, each of said elements having a beveled edge forming a socket to receive the edge of the adjacent element, one of the end elements of said series having a closure plate; a series of resilient arms, one of each being secured to each of said elements and extending substantially radially outward therefrom, each of said arms having an aperture in the outer end thereof; a bolt traversing said apertures; a series of cylindrical spacing elements, one of each being interposed between said resilient arms and surrounding said bolt, each of said arms being free to rotate with respect to the other of said arms about said axis of said bolt, and said arms normally biasing said elements axially together; and stop lugs mounted in axial alignment, one on the inside of each of said elements except the element at the opposite end of the series from the element having a closure plate, and said lugs each overlapping an adjacent element.

2. A measuring cup, comprising: a series of cylindrical tubular elements, each of said elements having a beveled edge forming a socket to receive the edge of the adjacent element, one of the end elements of said series having a closure plate; a series of resilient arms, one of each being secured to each of said elements and extending substantially radially outward therefrom, each of said arms having an aperture in the outer end thereof; a bolt traversing said apertures; a series of cylindrical spacing elements, one of each being interposed between said resilient arms and surrounding said bolt, each of said arms being free to rotate with respect to the other of said arms about said axis of said bolt, and said arms normally biasing said elements axially together; and a series of stop lugs mounted in axial alignment on the inside of said elements, each of said lugs being secured to one of said elements and overlapping an adjacent element.

3. A measuring cup, comprising: a series of cylindrical tubular elements, each of said elements having a beveled edge forming a socket to receive the edge of the adjacent element, one of the end elements of said series having a closure plate; a series of resilient arms, one of each being secured to each of said elements and extending substantially radially outward therefrom, each of said arms having an aperture in the outer end thereof; a bolt traversing said apertures; a series of cylindrical spacing elements, one of each being interposed between said resilient arms and surrounding said bolt, each of said arms being free to rotate with respect to the other of said arms about said axis of said bolt, and said arms normally biasing said elements axially together; and a series of stop lugs mounted on the side of said elements, each of said lugs being secured to one of said elements and overlapping an adjacent element.

4. A measuring cup, comprising: a series of cylindrical tubular elements, each of said elements having a beveled edge forming a socket to receive the edge of the adjacent element, one of the end elements of said series having a closure plate; a series of resilient arms, one of each being secured to each of said elements and extending substantially radially outward therefrom, each of said arms having an aperture in the outer end thereof; a bolt traversing said apertures; a series of cylindrical spacing elements, one of each being interposed between said resilient arms and surrounding said bolt, each of said arms being free to rotate with respect to the other of said arms about said axis of said bolt, and said arms normally biasing said elements axially together.

5. A measuring cup, comprising: a series of cylindrical tubular elements, each of said elements having a beveled edge forming a socket to receive the edge of the adjacent element, one of the end elements of said series having a closure plate; a series of resilient arms, one of each being secured to each of said elements and extending substantially radially outward therefrom, each of said arms having an aperture in the outer end thereof; securing means operative between said arms and said bolt for the transfer of bending moment to said arms, each of said arms being free to rotate with respect to the other of said arms about said axis of said bolt, and said arms normally biasing said elements axially together.

6. A measuring cup, comprising: a series of cylindrical tubular elements, each of said elements having a beveled edge forming a socket to receive the edge of the adjacent element, one of the end elements of said series having a closure plate; a series of arms, one of each being secured to each of said elements and extending substantially radially outward therefrom; and means providing a pivot connection for said arms adjacent the outer extremities thereof on axes substantially parallel to the axes of said cylindrical elements, said elements being axially separable from each other.

References Cited in the file of this patent

UNITED STATES PATENTS

| | | |
|---|---|---|
| 991,322 | Kimball | May 2, 1911 |
| 1,249,017 | Bankhurst | Dec. 4, 1917 |
| 1,385,484 | Case | July 26, 1921 |
| 2,688,418 | Carter | Sept. 7, 1954 |